May 22, 1945.  M. L. REED  2,376,621
SAFETY LANDING GEAR AND WHEELS FOR AIRPLANES
Filed Sept. 14, 1944  4 Sheets-Sheet 2
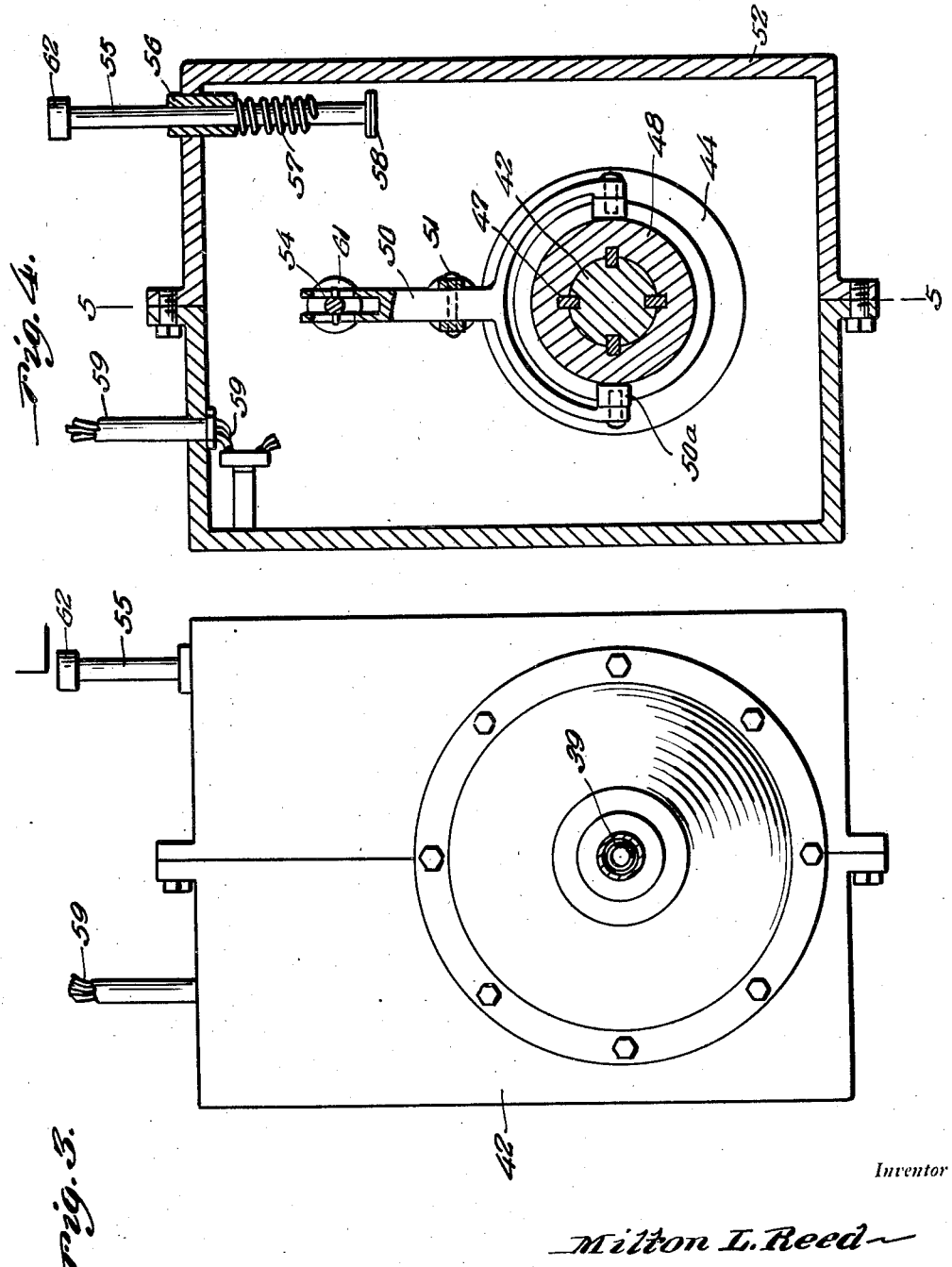
Inventor
Milton L. Reed
By Clarence A. O'Brien
and Harvey B. Jacobson
Attorneys May 22, 1945. M. L. REED 2,376,621
SAFETY LANDING GEAR AND WHEELS FOR AIRPLANES
Filed Sept. 14, 1944 4 Sheets-Sheet 3
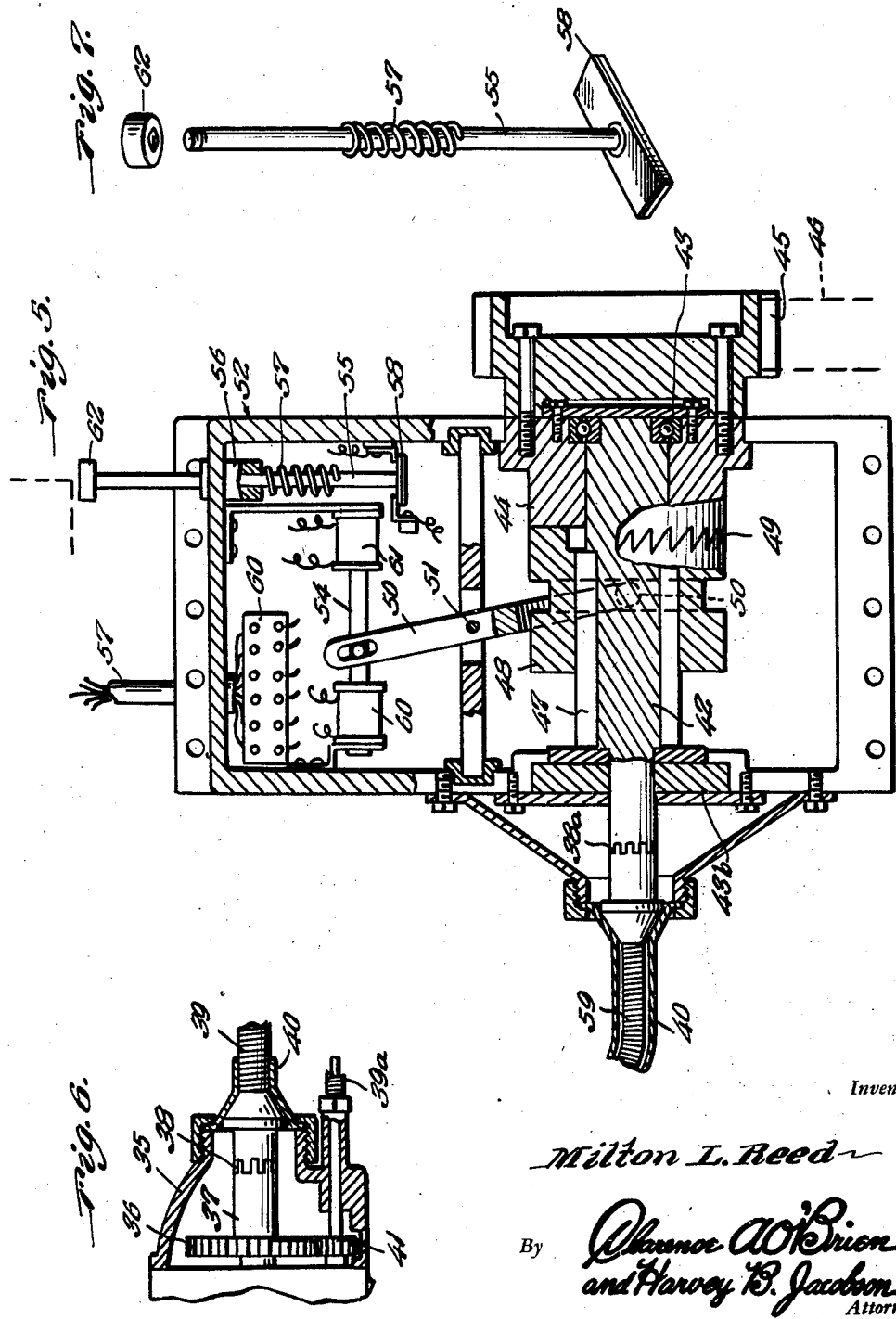
Inventor
Milton L. Reed
By Clarence A. O'Brien
and Harvey B. Jacobson
Attorneys

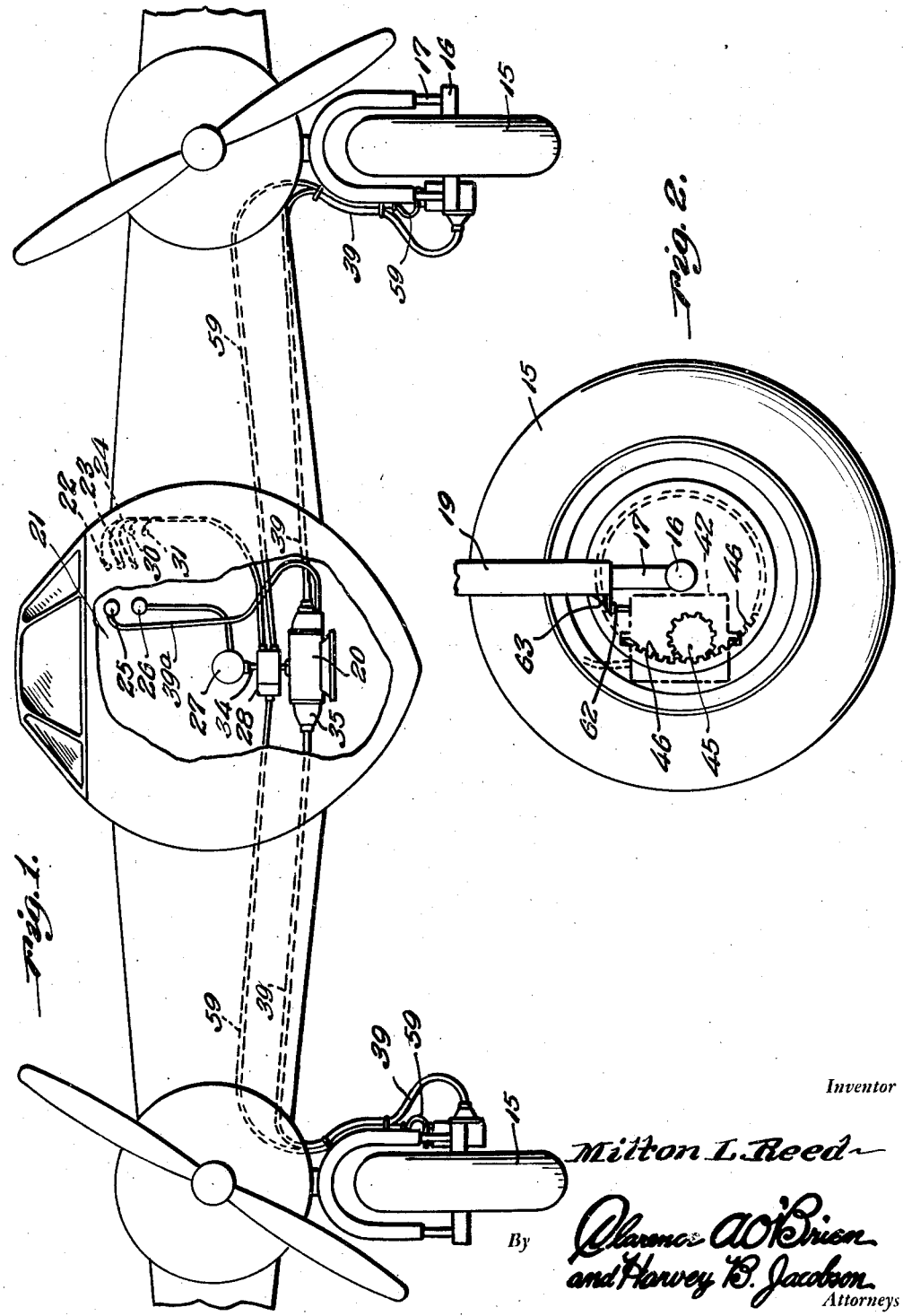

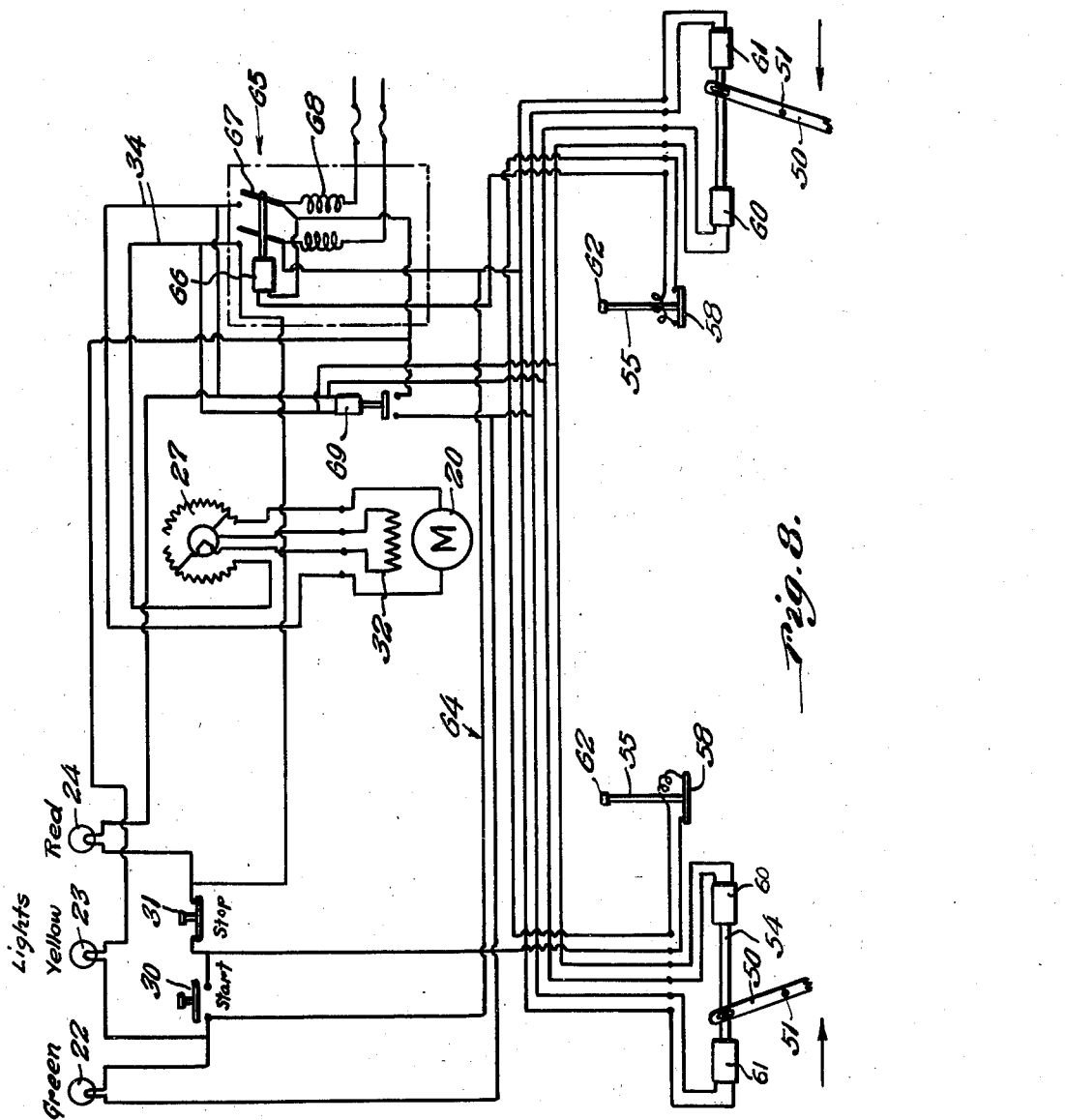

Patented May 22, 1945

2,376,621

UNITED STATES PATENT OFFICE 2,376,621

SAFETY LANDING GEAR AND WHEEL FOR AIRPLANES

Milton L. Reed, Avon, N. J.

Application September 14, 1944, Serial No. 554,068

7 Claims. (Cl. 244—103)

The present device consists of wheels and gearing for making airplane landing safer, smoother and more economical than with ordinary landing gears.

It has for one of its objects to set the landing wheels in motion before landing and in this manner conserve rubber by omitting skidding at point landing; to omit bump and jar in landing, and to eliminate blow-out from shock and jar as often occurring with wheels not in motion, when striking the ground at rapid speed. All these features tending to cut down percentage of accidents.

An embodiment of the invention is illustrated in the accompanying drawings, wherein the same numerals refer to the same details in the different views.

Figure 1 is a fragmentary front elevation of an airplane with a pair of landing wheels and gearing.

Figure 2 shows a side view of one wheel in larger scale.

Figure 3 is a face view of the ratchet gear case also in larger scale.

Figure 4 is a vertical section of Figure 3.

Figure 5 is a vertical section along line 5—5 of Figure 4.

Figure 6 is a fragmentary axial section of the end cap of the electric motor.

Figure 7 is a perspective view of stop button and contactor.

Figure 8 is a diagrammatic plan view of the wiring system.

In the drawings reference numeral 15 represents a wheel of the landing gear, generally provided in pairs (see Figure 1). Each wheel is as usual mounted for rotation on an axle 16 carried by a pair of pistons 17 in the hydraulic chambers formed in the fork 19 constituting a shock absorber. The latter is housed in the usual manner beneath the fuselage as indicated in Figure 1.

An electric motor 20 for the safety landing wheels, common to both is also placed either in the fuselage or in the pilot's compartment 21 as here indicated. In convenient position for the pilot are placed three lights 22, 23 and 24, a wheel speedometer 25 as well as a hand operated device 26 for the master controller 27 for the terminal box 28 of all electrical cables provided with a magnetic starter 65 in close proximity to the electric motor 20.

Starter button for the entire electric system 30 is shown adjacent to the lights 22, 23, 24 and also a first stop button 31.

The electric motor 20, provided with electric field 32 and armature is fed by an electric cable 34 and each end has a cap 35 removably secured thereon. In this cap is housed a gear wheel 36 fixed on the motor shaft 37 provided with a clutch 38 connecting it with a flexible drive shaft 39 enclosed in a flexible cable 40 (see Figure 6). The gear 36 is in mesh with another gear wheel 41, to the axle of which is attached another flexible drive shaft 39a which actuates the speedometer 25, Figure 1.

The drive shaft 39, one at each end, of the motor 20, extends to the ratchet gear case 52, one for each of the wheels 15, see Figures 3, 4 and 5, and connects by means of a clutch 38a with the ratchet gear stub shaft 42 running in ball bearings 43, and 43b carried in the bearing members 44 running freely in the gear case or housing 52 which is positioned eccentrically to the wheel axle 16, see Figure 2. A small gear 45 fixed on the bearing member 44 meshes with an internal ring gear 46 permanently secured as by welding on the landing wheel 15. Adjacent the bearing member 44 and keyed to be axially slidable on the stub shaft 42 by means of keys 47 is shown a ratchet sleeve 48 having ratchet teeth 49 adapted to mesh with similar teeth or the bearing member 44, when the ratchet sleeve 48 is pushed to the right in Figure 5 by means of a control arm 50, fulcrumed at 51 in the housing 52. The bifurcated arm 50 is provided with two radially directed studs or pins 50a engaging in an annular groove furnished around the ratchet sleeve 48.

The upper end of the arm 50 pivotally engages a solenoid rod or iron core 54 horizontally movable in or out of the solenoid magnets 60 and 61 which alternately engage one of its ends. Thus when magnet 60 is energized the core 54 is drawn to the left in the drawings, Figure 5, thereby swinging arm 50 to make ratchet connection between members 44 and 48 and to revolve gears 44, 46 and landing wheels 15, provided that the drive shaft 39 is turning at the time. With magnet 61 energized, the opposite function occurs, so that the landing wheels 15 do not turn.

In the box 52 is also to be seen a push rod 55 mounted for vertical displacement in a bearing 56 and normally held in raised position by a spring 57 thereby closing the contacts at 58 situated in an electric circuit 54 fed by a cable 59 from a source of current to the board 60a in which circuit are also included the two electromagnets 60, 61. When push rod 55, 62 is pressed down at point of landing the switch is opened and the solenoid is deenergized. In the position as in Figure 5 the switch is closed and the left magnet 60 energized and the ratchet 44, 48 engaged to turn the landing wheel 15. With the shock absorber in action the exterior head 62 on the push rod 55 will contact with the head 63 on the shock absorber 19, thereby opening the switch to demagnetize magnet 60 and release the ratchet connection 44, 48 and stop the wheel 15, although the shaft 42 still continues to rotate.

In Figure 8 is shown a wiring diagram for this safety landing gear and its electrical system 64. In this system 64 is included the motor 20, with its field 32 and the master controller 27 and the green, yellow and red pilot lights 22, 23 and 24, of which 22, green lights when the system is not in use, 23, yellow is on at all times and 24, red glows when system is in use. Should 23 be off at any time, this indicates main line power failure. 24 red light is on when the system is in use and goes out when the system is cut off by the first start button 31 or the shock absorber button 62, see Figure 1. Numeral 26, same figure is a hand control for the master controller 27. Numeral 30 is the starting button for the entire system and 31 the cut out button.

At 65 is shown the electric starter cabinet with solenoid 66, switch fingers 67 and overload coils 68 for protection of motor 20. This solenoid is energized when button 30 is pushed and deenergized when buttons 31 or 62 are pushed.

Another solenoid 69 is energized when the system is in use and deenergized when it is not in use.

*Synopsis of action during use of safety landing wheel*

Pilot light 23, yellow is on at all times to indicate main power lines are energized. Green pilot light 22 is on when system is not in use and also indicates that gear in ratchet arrangement is out of use on both wheels. When magnetic solenoid is deenergized, it in turn energizes magnetic solenoid 61 in ratchet arrangement on both wheels. Therefore ratchet gear 48, 49 (Fig. 5) is kept out of use, indicated to pilot through green light 22.

When starting system for use pilot pushes starting button 30 which energizes magnetic solenoid 66 in magnetic starter 65 (Figure 8). This in turn energizes the magnetic solenoid 69 located near magnetic switch 65 (Figure 8) also solenoid 60 in ratchet arrangement of each wheel.

When magnetic coil 69 is energized coils 61 in ratchet arrangements become deenergized, also pilot light 22 goes out. This put ratchet gear 48 into use on both wheels and at the same time magnetic starter 65 (Figure 8) allows power to flow to motor control 27, thus lighting red pilot light 24 showing that system is in operation. In order to bring landing wheels to proper speed of landing, pilot must adjust motor control 26 in pilot's compartment (through drive cables) to 27. The speed of the wheels is then registered on wheel speedometer 25 in pilot's compartment through drive cables as shown on Figure 2. This puts system in desired use.

At point of landing shock absorber 19 comes down and pushes stop button 62 on port wheel 15 or on star wheel (whichever wheel strikes first). This action is shown in Figure 1. When stop buttons are pushed in either wheel this deenergizes magnetic solenoid 66 in starter 65 (Figure 8), and which in turn deenergizes 69 and this in turn energizes solenoid 61 in ratchet arrangements. This throws entire system off and pulls ratchet gear 48 out of use.

This entire action may be accomplished by pilot pushing stop button 31 in pilot's compartment in case of an emergency.

It is understood that the invention as here described is not limited to the details here described and shown but that the same may be varied widely without departing from the spirit of the invention as defined by the subjoined claims.

I claim:

1. A safety landing device for airplanes, comprising in combination a landing wheel mounted to run freely in a shock absorber; of means for rotating said wheel preparatory to landing, said means consisting of a gear box, a stub shaft in said box for actuating said wheel, a ratchet sleeve and gear attachment for positively connecting said shaft to the wheel, a pair of oppositely acting electro-magnets for throwing the sleeve in and out of engagement, and a push rod in said box adjacent the shock absorber, controlling the magnets for throwing out said sleeve, and an electric motor exteriorly to said box in a circuit also containing said magnets, a flexible shaft between said motor and said stub shaft, a master switch and hand operated switches for opening and closing said circuit within reach of the pilot of the airplane.

2. A safety landing device for airplanes, comprising in combination a landing wheel mounted to run freely in a shock absorber; of means for rotating said wheel preparatory to landing, said means consisting of a gear box, a stub shaft in said box for actuating said wheel, a ratchet sleeve and gear attachment for positively connecting said shaft to the wheel, a pair of oppositely acting electro-magnets for throwing the sleeve in and out of engagement, and a push rod in said box adjacent the shock absorber, controlling the magnets for throwing out said sleeve, and an electric motor exteriorly to said box in a circuit also containing said magnets, a flexible shaft between said motor and said stub shaft, a master switch and hand operated switches for opening and closing said circuit within reach of the pilot of the airplane; said motor being provided with a terminal box for all cables in said circuit governed by said magnetic starter.

3. A safety landing device for airplanes, comprising in combination a landing wheel mounted to run freely in a shock absorber; of means for rotating said wheel preparatory to landing, said means consisting of a gear box, a stub shaft in said box for actuating said wheel, a ratchet sleeve and gear attachment for positively connecting said shaft to the wheel, a pair of oppositely acting electro-magnets for throwing the sleeve in and out of engagement, and a push rod in said box adjacent the shock absorber, controlling the magnets for throwing out said sleeve, and an electric motor exteriorly to said box in a circuit also containing said magnets, a flexible shaft between said motor and said stub shaft, a master switch and hand operated switches for opening and closing said circuit within reach of the pilot of the airplane; said motor being provided with a terminal box for all cables in said circuit governed by said magnetic starter, and a set of differently colored lights for automatically indicating to the pilot the condition of the electric circuit.

4. A safety landing device for airplanes, comprising in combination a landing wheel mounted to run freely in a shock absorber; of means for rotating said wheel preparatory to landing, said means consisting of a gear box, a stub shaft in said box for actuating said wheel, a ratchet sleeve and gear attachment for positively connecting said shaft to the wheel, a pair of oppositely acting electro-magnets for throwing the sleeve in and out of engagement, and a push rod in said box adjacent the shock absorber, controlling the magnets for throwing out said sleeve, and an electric motor exteriorly to said box in a circuit also containing said magnets, a flexible shaft between said motor and said stub shaft, a master switch and hand operated switches for opening and closing said circuit within reach of the pilot of the airplane; said motor being provided with a terminal box for all cables in said circuit governed by said magnetic starter; a wheel speedometer within reach of the pilot actuated by a speed gear in said motor and a separate flexible connection between said speed gear and said speedometer.

5. A safety landing device for airplanes, comprising in combination a landing wheel mounted to run freely in a shock absorber; of means for rotating said wheel preparatory to landing, said means consisting of a gear box, a stub shaft in said box for actuating said wheel, a ratchet sleeve and gear attachment for positively connecting said shaft to the wheel, a pair of oppositely acting electro-magnets for throwing the sleeve in and out of engagement, an intermediary shifting rod between said magnets and the sleeve, and a push rod in said box adjacent the shock absorber, controlling the magnets for throwing out said sleeve, and an electric motor exteriorly to said box in a circuit also containing said magnets, a flexible shaft between said motor and said stub shaft, a master switch and hand operated switches for opening and closing said circuit within reach of the pilot of the airplane.

6. A safety landing device for aircraft, comprising in combination a pair of landing wheels mounted to run freely in a shock absorber; of means for rotating said wheels preparatory to landing, said means consisting of a gear box, a stub shaft in said box for actuating said wheels, a ratchet sleeve and gear attachment for positively connecting said shaft to the wheels, a pair of oppositely acting electro-magnets for throwing the sleeve in and out of engagement and a push rod in said box adjacent the shock absorber, controlling the magnets for throwing out said sleeve, and an electric motor exteriorly to said box in a circuit also containing said magnets, a flexible shaft between said motor and said stub shaft, a master switch and hand operated switches for opening and closing said circuit within reach of the pilot of the airplane.

7. A safety landing device for aircraft, comprising in combination a pair of landing wheels mounted to run freely in a shock absorber; of means for rotating said wheels preparatory to landing, said means consisting of a gear box, a stub shaft in said box for actuating said wheels, a ratchet sleeve and gear attachment for positively connecting said shaft to the wheels, a pair of oppositely acting electro-magnets for throwing the sleeve in and out of engagement and a push rod in said box adjacent the shock absorber, controlling the magnets for throwing out said sleeve, and an electric motor exteriorly to said box in a circuit also containing said magnets, a flexible shaft between said motor and said stub shaft, a master switch and hand operated switches for opening and closing said circuit within reach of the pilot of the airplane; said motor being provided with a terminal box for all cables in said circuit governed by said magnetic starter; and a set of differently colored lights for automatically indicating to the pilot the condition of the electric circuit; a wheel speedometer within each of the pilot actuated by the speed gear in said motor and a separate flexible connection between said speed gear and said speedometer.

MILTON L. REED.